United States Patent
Suhocki et al.

(10) Patent No.: US 8,042,526 B2
(45) Date of Patent: Oct. 25, 2011

(54) TORSION DAMPING MECHANISM FOR A SUPERCHARGER

(75) Inventors: Christopher Suhocki, Marshall, MI (US); Mark H. Pratley, Marshall, MI (US); Christopher W. Creager, Ypsilanti, MI (US); Daniel R. Ouwenga, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 445 days.

(21) Appl. No.: 12/200,514

(22) Filed: Aug. 28, 2008

(65) Prior Publication Data

US 2009/0062018 A1 Mar. 5, 2009

Related U.S. Application Data

(60) Provisional application No. 60/969,842, filed on Sep. 4, 2007.

(51) Int. Cl.
*F02B 33/00* (2006.01)
*F16D 41/20* (2006.01)
*F16D 3/00* (2006.01)
*F16C 1/00* (2006.01)

(52) U.S. Cl. ......... 123/559.1; 192/41 S; 464/57; 464/97

(58) Field of Classification Search ............... 123/559.1; 280/237; 192/41 S, 217.2, 217.6; 464/57, 464/60, 90–91, 97–98, 160
See application file for complete search history.

(56) References Cited

U.S. PATENT DOCUMENTS

| | | | | |
|---|---|---|---|---|
| 1,431,401 A * | 10/1922 | Hupp | ............................. | 464/57 |
| 1,705,984 A * | 3/1929 | Lindsay | ............................. | 464/57 |
| 3,019,871 A * | 2/1962 | Sauzedde | ............................. | 192/41 S |
| 3,673,813 A * | 7/1972 | Wright | ............................. | 464/97 |
| 4,545,263 A * | 10/1985 | Fickelscher | ............................. | 74/640 |
| 4,844,044 A * | 7/1989 | McGovern | ............................. | 123/559.1 |
| 4,924,839 A * | 5/1990 | Mueller et al. | ............................. | 123/559.1 |
| 4,944,279 A * | 7/1990 | Woodard | ............................. | 123/559.1 |
| 4,953,517 A * | 9/1990 | McGovern et al. | ............................. | 123/559.1 |
| 5,893,355 A | 4/1999 | Glover et al. | ............................. | 123/559.1 |
| 5,964,662 A * | 10/1999 | Horak et al. | ............................. | 464/57 |
| 6,253,747 B1 | 7/2001 | Sell et al. | ............................. | 123/559.1 |
| 6,386,566 B1 | 5/2002 | Freeberg et al. | ............................. | 280/237 |
| 6,880,536 B2 | 4/2005 | Pratley et al. | ............................. | 123/559.1 |
| 7,594,334 B2 * | 9/2009 | Kocha | ............................. | 464/57 |
| 7,681,559 B2 * | 3/2010 | Pratley et al. | ............................. | 123/559.1 |
| 7,712,592 B2 * | 5/2010 | Jansen et al. | ............................. | 192/41 S |
| 2008/0149452 A1 | 6/2008 | Pratley et al. | ............................. | 123/559.1 |

OTHER PUBLICATIONS

International Search Report and the Written Opinion of the International Searching Authority for PCT/US2008/010382, Mailed Nov. 17, 2008.

* cited by examiner

*Primary Examiner* — Thai Ba Trieu

(74) *Attorney, Agent, or Firm* — Dykema Gossett PLLC

(57) ABSTRACT

A torsion damping mechanism for a rotary blower is provided that includes an input hub adapted to engage a first end of a torsion spring and an output hub adapted to engage a second end of the torsion spring. An intermediate hub is fixed for rotation with a first drive member. A bearing member includes an inner portion connected for rotation with the intermediate hub and an outer portion connected for rotation with the output hub. The bearing member may be a one-way bearing that permits torque to flow from the output hub into the intermediate hub and the first drive member when the output hub is driven in a first rotational direction, and permits the output hub to rotate relative to the intermediate hub with no substantial torque transfer therebetween when the output hub is driven in a second rotational direction.

14 Claims, 4 Drawing Sheets

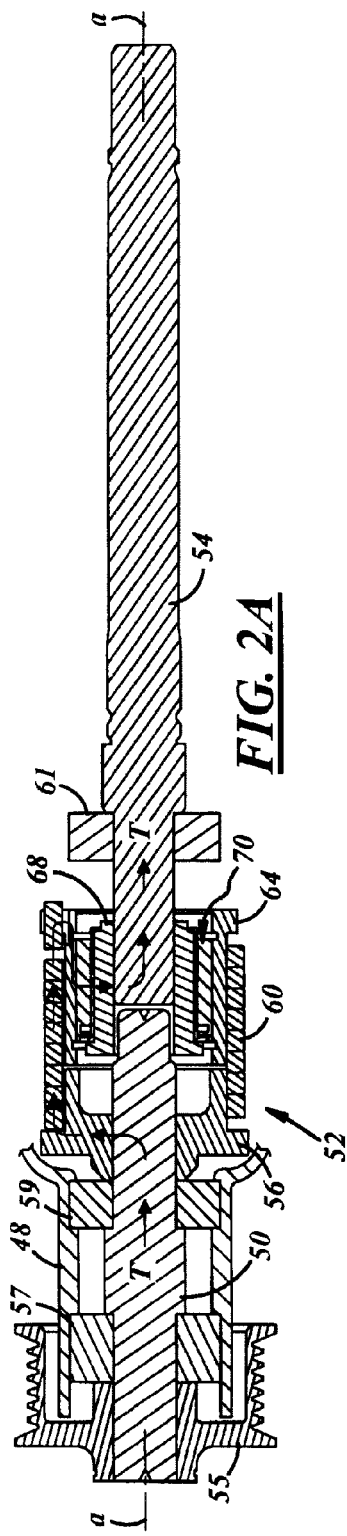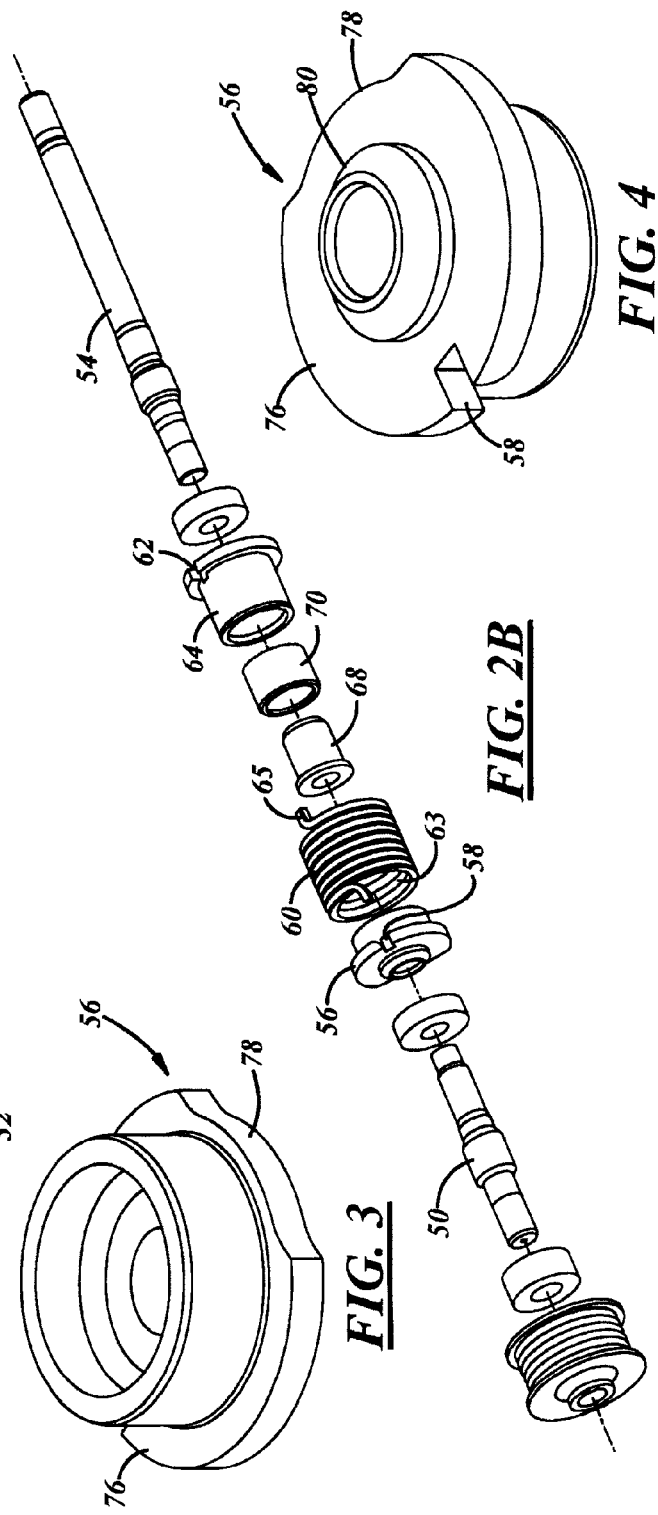

TORSION DAMPING MECHANISM FOR A SUPERCHARGER

RELATED APPLICATIONS

This application claims the benefit of U.S. Provisional Patent Application No. 60/969,842 filed Sep. 4, 2007, hereby incorporated by reference in its entirety.

TECHNICAL FIELD

The present invention relates to a torsion damping mechanism for a supercharger or rotary blower, including a torsion damping mechanism (e.g., "isolator") for reducing audible noise from the supercharger or blower, and especially from the timing gears.

BACKGROUND

Although the present invention may be used advantageously on many different types of blowers, regardless of the manner of input drive to the blower, the present invention is especially adapted for use with a Roots-type rotary blower that is driven by an internal combustion engine. In a typical internal combustion engine used commercially for on-highway vehicles, the torque output of the engine is not perfectly smooth and constant, but instead, is generated in response to a series of individual, discrete combustion cycles.

A typical Roots-type blower transfers volumes of air from the inlet port to the outlet port, whereas a screw compressor actually achieves internal compression of the air before delivering it to the outlet port. However, for purposes of the present invention, the blower, or compressor, generally includes a pair of rotors, which must be timed in relationship to each other, and therefore, are driven by meshed timing gears. As is now well known to those skilled in the blower art, the timing gears are potentially subject to conditions such as gear rattle and bounce.

Rotary blowers of the type to which the present invention relates (e.g., either Roots-type or screw compressor type) are also referred to as "superchargers," because they are used to effectively supercharge the intake side of the engine. Typically, the input to an engine supercharger is a pulley and belt drive arrangement that is configured and sized such that, at any given engine speed, the amount of air being transferred into the intake manifold is greater than the instantaneous displacement of the engine, thus increasing the air pressure within the intake manifold, and increasing the power density of the engine.

Rotary blowers of either the Roots-type or the screw compressor type are characterized by the potential to generate noise. For example, Roots-type blower noise may be classified as either of two types. The first is solid borne noise caused by rotation of timing gears and rotor shaft bearings subjected to fluctuating loads (the periodic firing pulses of the engine). The noise, which may be produced by the meshed teeth of the timing gears during unloaded (non-supercharging), low-speed operation is also referred to as "gear rattle." The second type of noise is fluid borne noise caused by fluid flow characteristics, such as rapid changes in the velocity of the fluid (i.e., the air being transferred by the supercharger). The present invention is concerned primarily with the solid borne noise caused by the meshing of the timing gears.

To minimize solid borne noise, torsion damping mechanisms (e.g., "isolators") have been developed, which can minimize the "bounce" of the timing gears during times of relatively low speed operation, when the blower rotors are not "under load." Such torsion damping mechanisms are also referred to as "isolators" because part of their function is to isolate the timing gears from the speed and torque fluctuations of the input to the supercharger. A torsion damping mechanism or torsional isolator may have the opportunity to create a noise referred to as clunk. Clunk noise is generated when the negative input torque exceeds the isolator's negative torque capacity. The clunk noise includes the noise generated by impacts within the mechanical components of the isolator and the impact of the timing gear teeth to each other.

SUMMARY

A torsion damping mechanism for a rotary blower may be provided. The torsion damping mechanism may be adapted to be rotatably interposed between a first drive member for driving a first gear in constant mesh with a second gear and a second drive member rotatably driven in a first rotational direction by torque from an engine. The torsion dampening mechanism may comprise: an input hub driven by the second drive member and adapted to engage a first end of a torsion spring; an output hub adapted to drive the first drive member and to engage a second end of the torsion spring; an intermediate hub fixed for rotation with the first drive member; and a bearing member. The bearing member may have an inner portion connected for rotation with the intermediate hub and an outer portion connected for rotation with the output hub. The bearing member may be a one-way bearing that permits torque to flow from the output hub into the intermediate hub and the first drive member when the output hub is driven in a first rotational direction, and permits the output hub to rotate relative to the intermediate hub with no substantial torque transfer therebetween when the output hub is driven in a second rotational direction opposite the first rotational direction. A rotary blower employing a torsion dampening mechanism may also be provided.

BRIEF DESCRIPTION OF THE DRAWINGS

Embodiments of the invention will now be described, by way of example, with reference to the accompanying drawings, wherein:

FIG. 2A is a cross-sectional view of a torsion damping mechanism according to an embodiment of the present invention;

FIG. 2B is an exploded view of a torsion damping mechanism according to an embodiment of the present invention;

FIG. 3 is first perspective view of an input hub of the torsion damping mechanism shown in FIGS. 2A-2B;

FIG. 4 is a second perspective view of an input hub of the torsion damping mechanism shown in FIGS. 2A-2B;

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
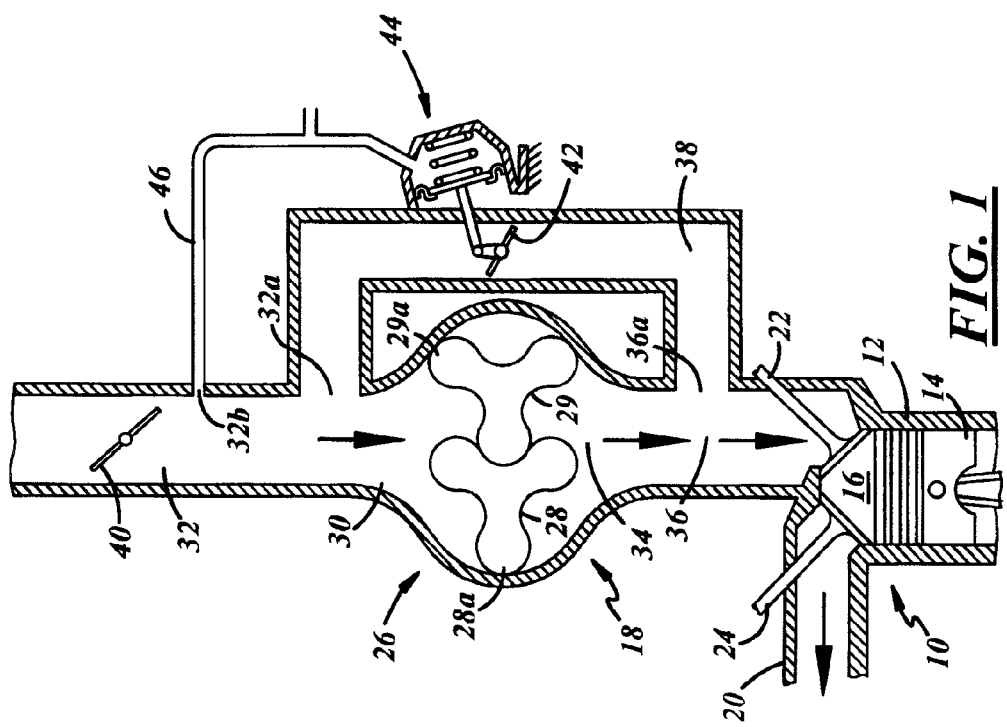
FIG. 1 is a schematic illustration of an intake manifold assembly having a positive displacement blower or supercharger for boosting intake pressure to an internal combustion engine.

Schematically illustrated in FIG. 1 is a portion of an internal combustion engine 10, which may be of a periodic combustion type, such as the Otto or Diesel cycle type. The engine 10 may include a plurality of cylinders 12 and a reciprocating piston 14 disposed within each cylinder to define an expandable combustion chamber 16. The engine 10 may also include intake and exhaust manifold assemblies 18, 20 for respectively directing combustion air to and from the combustion chambers 16 via intake and exhaust valves 22, 24.

The intake manifold assembly 18 may include a positive displacement blower or supercharger 26 of the backflow or Roots-type. The blower 26 may have a housing and a pair of rotors 28, 29 with meshed lobes 28a, 29a rotatably supported by the housing. The rotors 28, 29 may be fixed to rotor shafts that may also be rotatably supported by the housing. The rotors 28, 29 may be fixed to the rotor shafts for rotation. The rotors 28, 29 may be mechanically driven by engine crankshaft torque transmitted thereto in a known manner via a drive belt (not shown). The mechanical drive may rotate the blower rotors 28, 29 at a fixed ratio relative to crankshaft speed, such that the blower displacement is greater than the engine displacement, thereby boosting or supercharging the air going to the engine combustion chambers to increase engine power. Although a pair of rotors are described in detail, fewer or more rotors may be utilized in other embodiments.

The illustrated blower 26 may include an inlet port 30 that receives an air or air-fuel mixture charge from an intake duct or passage 32 and a discharge or outlet port 34 directing the charge to the intake valves 22 via a discharge duct or passage 36. The intake and discharge ducts 32, 36 may be intercommunicated via a bypass duct or passage 38 connected at openings 32a, 36a in the intake and discharge ducts 32, 36, respectively. If the engine 10 is of the Otto cycle type, a throttle valve 40 may control air or air-fuel mixture flow into intake duct 32 from a source, such as ambient or atmospheric air, in a manner known in the art.

Disposed within the bypass duct 38 may be a bypass valve 42, which may be moved between open and closed positions by an actuator assembly 44 that may be responsive to pressure in intake duct 32 via a line 46 and, therefore, operative to control supercharging pressure in duct 36 as a function of engine power demand. When bypass valve 42 is in the fully open position, the air pressure in discharge duct 36 is relatively low relative to the air pressure in intake duct 32. When the valve 42 is fully closed, the air pressure in the discharge duct is relatively high.

Referring to FIGS. 2A-2B, a portion of blower 26 is shown in detail. In the illustrated configuration, blower 26 may include a housing assembly 48 (partially shown in FIG. 2A), an input drive member 50, a torsion damping mechanism 52 according to an embodiment of the present invention, and an output member 54 drivingly connected to the rotors 28, 29 (not shown in FIG. 2A).

Input and output drive members 50, 54 may be rotatable relative to the housing assembly 48. Input torque produced by the engine 10 may be received by the input drive member 50 and may be routed through the torsion damping mechanism 52 into the output drive member 54. A pulley 55 may be connected to an end of the input drive member 50. Pulley 55 may be driven by the previously mentioned drive belt (not shown) which may transmit engine torque to the blower 26. Input drive member 50 may be supported by bearings 57, 59, and output drive member 54 may also be supported by bearings 61. The output drive member 54 may be considered a first drive member, and the input drive member 50 may be considered a second drive member in accordance with an embodiment of the invention. A first timing gear (not shown) of blower 26 may be connected to an end of the output drive member 54 as is known in the art. The first timing gear (not shown) may be in constant mesh with a second timing gear (not shown) of blower 26. The timing gears may be press fit into the rotor shafts (not shown) as is known in the art and may be operative to prevent contact of the lobes 28a, 29a of the rotors 28, 29.

During non-supercharging, low engine speed or idle speed operation, the meshed teeth of the blower timing gears may be substantially unloaded and may bounce or clash back and forth against each other through the backlash therebetween. The bounce or clash may produce an objectionable noise known as gear rattle and is believed to be caused by torsionals in the supercharger drive torque provided by periodic combustion engines such as engine 10. The resilient drive provided by torsion damping assembly 52 may reduce the rattle noise below the audible range.

Figure 5:
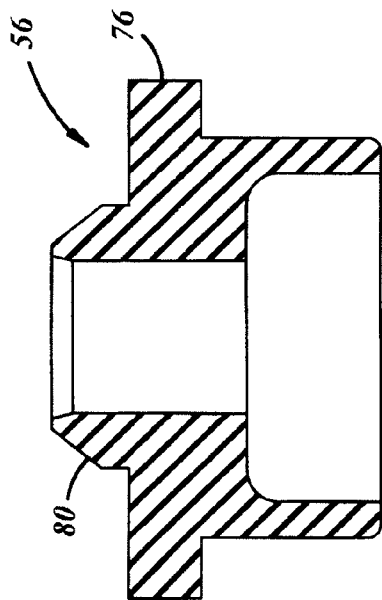
FIG. 5 is a cross-sectional view of an input hub of the torsion damping mechanism shown in FIGS. 2A-2B.

As shown in FIG. 2A, torsion damping mechanism 52 may be disposed for rotation about the common axis a-a of the input and output drive members 50, 54. The input drive member 50 may be fixed for rotation with an input hub 56. Referring now to FIGS. 3-5, input hub 56 may be generally cylindrical in shape. Input hub 56 may include a circumferentially extending flange 76. The input hub 56 (specifically, for example, the circumferentially extending flange 76 of input hub 56) may include a first receiving groove 58 adapted to receive a first end 63 of a torsion spring 60. The circumferentially extending flange 76 may include at least in part a scalloped edge 78. The input hub 56 may further include a tapered cylindrical portion 80 that may extend from the end of the input 56 with the circumferentially extending flange 76.

Figure 7:
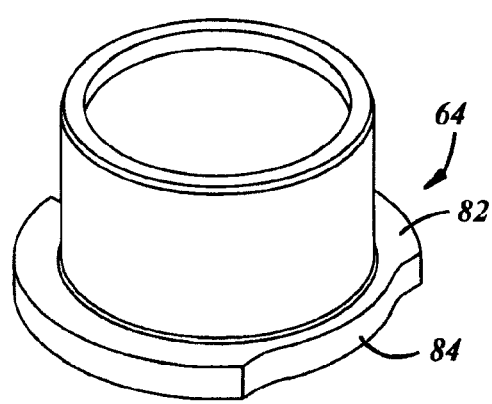
FIG. 7 is a first perspective view of an output hub of the torsion damping mechanism shown in FIGS. 2A-2B.
Figure 8:
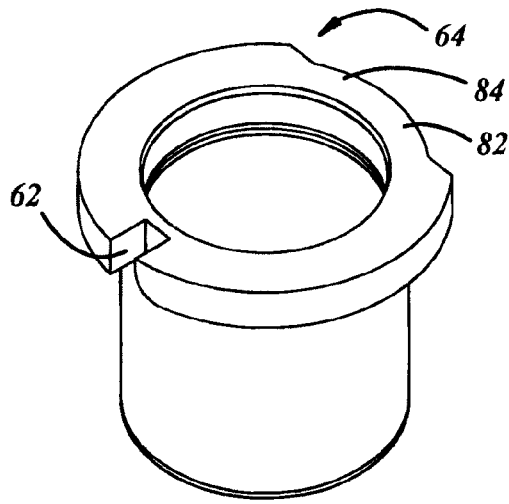
FIG. 8 is a second perspective view of an output hub of the torsion damping mechanism shown in FIGS. 2A-2B.
Figure 9:
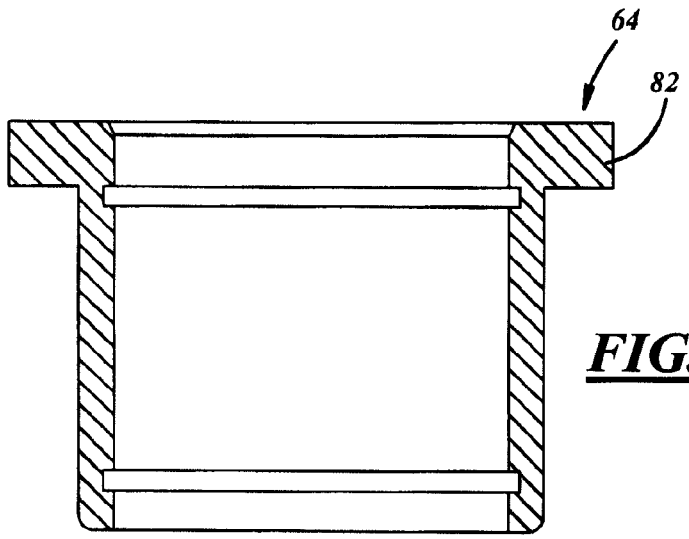
FIG. 9 is a cross-sectional view of an output hub of the torsion damping mechanism shown in FIGS. 2A-2B.

Referring again to FIGS. 2A-2B, a second end 65 of the torsion spring 60 may be adapted to engage a second receiving groove 62 in an output hub 64. Referring now to FIGS. 7-9, output hub 64 may be generally cylindrical in shape. Output hub 64 may include a circumferentially extending flange 82. The output hub 64 (specifically, for example, the circumferentially extending flange 82 of output hub 64) may include a second receiving groove 62 adapted to receive a second end 64 of the torsion spring 60. The circumferentially extending flange 82 may include at least in part a scalloped edge 84.

Figure 6:
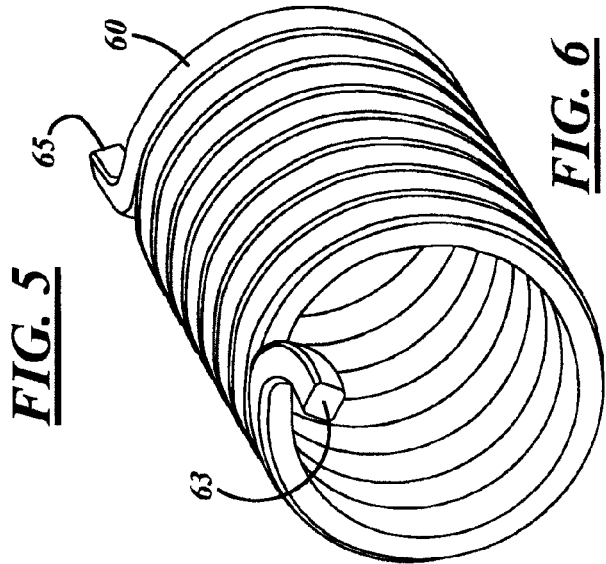
FIG. 6 is a perspective view of a torsion spring of the torsion damping mechanism shown in FIGS. 2A-2B.

Referring now to FIG. 6, the axially extending, opposite ends or tangs 63, 65 of torsion spring 60 may be received in grooves 58, 62 and may be interconnected by a plurality of helically wound coils. In an embodiment, the torsion spring 60 may include about eight coils. Although eight coils is mentioned in detail, torsion spring 60 may include more or fewer coils in other embodiments. In an embodiment, the helically wound coils may be disposed about portions of the input and output hubs 56, 64. Torsion spring 60 may provide a resilient drive between the input and output hubs 56, 64, which may attenuate and/or isolate torque fluctuations or torque spikes in a first or positive rotational direction for preventing audible gear tooth rattle of the timing gears during non-supercharging, low engine speed modes of operation.

Figure 10:
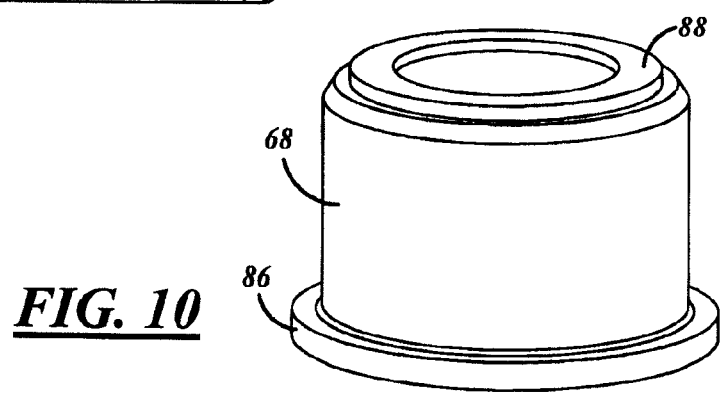
FIG. 10 is a perspective view of an intermediate hub of the torsion damping mechanism shown in FIGS. 2A-2B.
Figure 11:
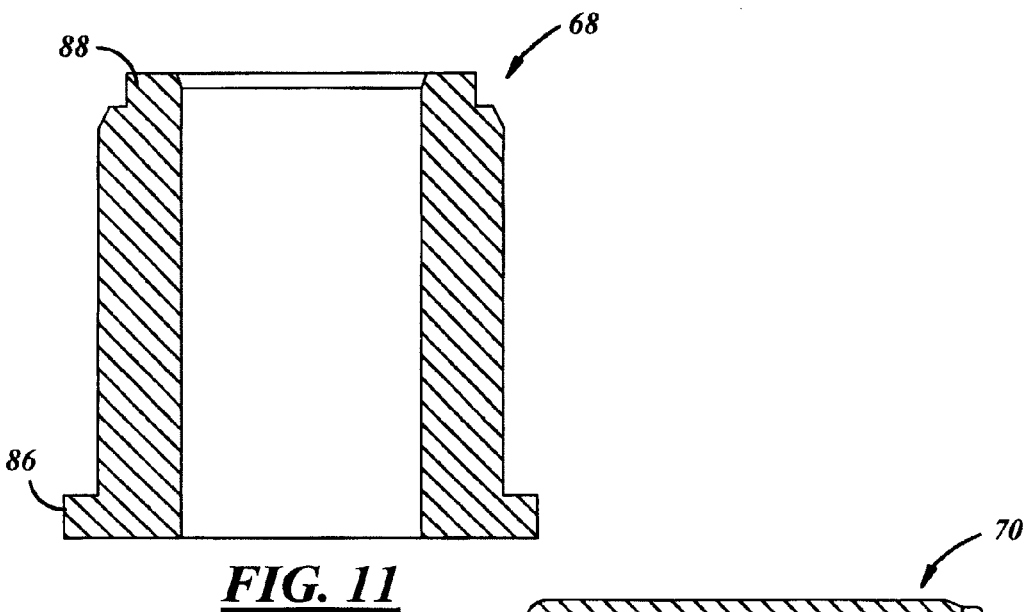
FIG. 11 is a cross-sectional view of an intermediate hub of the torsion damping mechanism shown in FIGS. 2A-2B.
Figure 12:
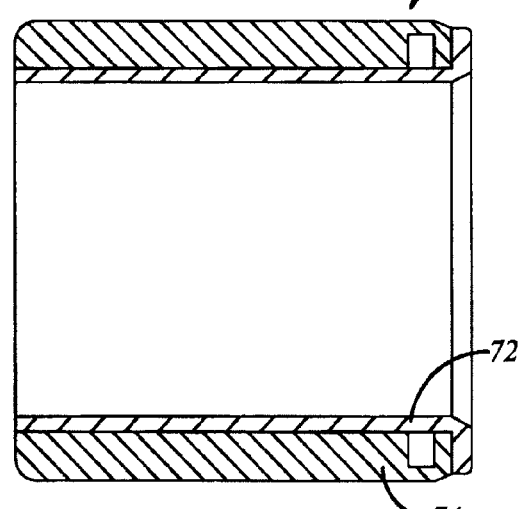
FIG. 12 is a cross-sectional view of a bearing of the torsion damping mechanism shown in FIGS. 2A-2B.
Figure 13:
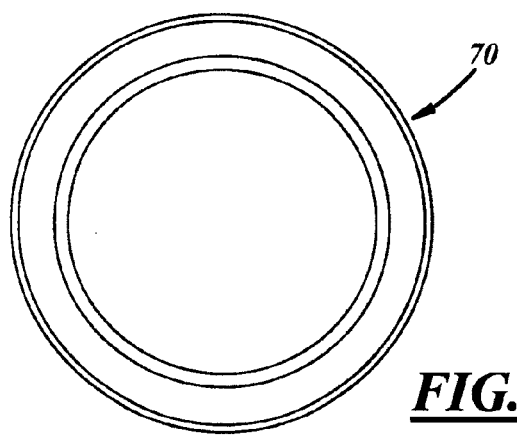
FIG. 13 is s front view of a bearing of the torsion damping mechanism shown in FIGS. 2A-2B.

Torsion damping mechanism 52 may also include an intermediate hub 68. Referring again to FIGS. 2A-2B, intermediate hub 68 may be fixed for rotation with output drive member 54. Referring now to FIGS. 10-11, intermediate hub 68 may be generally cylindrical in shape. The intermediate hub 68 may include a circumferentially extending flange 86 at a first end. The intermediate hub 68 may include a cylindrical portion 88 at a second end of the intermediate hub 68 (e.g., opposite the first end of the intermediate hub 68 with the circumferentially extending flange 86). The cylindrical portion 88 may have a smaller outer diameter than the outer diameter of the remainder of the intermediate hub 68.

Torsion damping mechanism 52 may also include a bearing member 70. Referring now to FIGS. 2A-2B and 12-13, bearing member 70 may have an inner portion 72 connected for rotation with the intermediate hub 68 and an outer portion 74 connected for rotation with the output hub 64. In an embodiment of the invention, bearing member 70 may be a one-way bearing that may permit torque T (represented by arrows in FIG. 2A) to flow from output hub 64 into intermediate hub 68 and output drive member 54 when output hub 64 is driven in a first rotational direction, and may permit output hub 64 to rotate relative to intermediate hub 68 with no substantial torque transfer between the components (i.e., between output hub 64 and intermediate hub 68) when output hub 64 is driven in a second rotational direction (e.g., opposite the first rotational direction). Since bearing member 70, by virtue of its one-way operation, may prevent the transfer of torque between the input and output hubs 56, 64 in the second or negative rotational direction, it may attenuate ore eliminate torque spikes in the negative rotational direction for preventing audible clunk noise.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A rotary blower including a housing; first and second rotors disposed in the housing and having meshed lobes for transporting air from an inlet port to an outlet port; first and second shafts rotatably supported by the housing and having the first and second rotors fixed for rotation therewith; first and second timing gears fixed for rotation with the first and second shafts for preventing contact of the meshed lobes; an input pulley adapted to be rotatably driven about an axis; and a torsion damping mechanism operably associated with the input pulley, the torsion damping mechanism comprising:
   a torsion spring;
   an input hub adapted to engage a first end of the torsion spring;
   an output hub adapted to engage a second end of the torsion spring;
   an intermediate hub disposed proximate the output hub, wherein the intermediate hub includes a circumferentially extending flange; and
   a bearing member disposed between the output hub and the intermediate hub, wherein the output hub, the bearing member, and the intermediate hub are concentric, wherein an axial end of the bearing member is configured for engagement with the circumferentially extending flange of the intermediate hub, and wherein the bearing member has an inner portion connected for rotation with the intermediate hub and an outer portion connected for rotation with the output hub, and wherein the bearing member is a one-way bearing that permits torque to flow from the output hub into the intermediate hub when the output hub is driven in a first rotational direction, and permits the output hub to rotate relative to the intermediate hub with no substantial torque transfer therebetween when the output hub is driven in a second rotational direction opposite the first rotational direction.

2. The rotary blower in accordance with claim 1, wherein the input hub is generally cylindrical.

3. The rotary blower in accordance with claim 2, wherein the input hub includes a circumferentially extending flange.

4. The rotary blower in accordance with claim 3, wherein the circumferentially extending flange of the input hub includes a first receiving groove adapted to receive a first end of said torsion spring.

5. The rotary blower in accordance with claim 3, wherein the circumferentially extending flange of the input hub includes a scalloped edge.

6. The rotary blower in accordance with claim 3, wherein the input hub includes a tapered cylindrical portion extending from the circumferentially extending flange of the input hub.

7. The rotary blower in accordance with claim 1, wherein said torsion spring includes a plurality of helically wound coils.

8. The rotary blower in accordance with claim 7, wherein the helically wound coils are configured to be disposed about portions of the input hub and the output hub.

9. The rotary blower in accordance with claim 1, wherein the output hub is generally cylindrical.

10. The rotary blower in accordance with claim 1, wherein the output hub includes a circumferentially extending flange.

11. The rotary blower in accordance with claim 10, wherein the circumferentially extending flange of the output hub includes a second receiving groove adapted to receive the second end of said torsion spring.

12. The rotary blower in accordance with claim 10, wherein the circumferentially extending flange of the output hub includes a scalloped edge.

13. The rotary blower in accordance with claim 1, wherein the intermediate hub is generally cylindrical.

14. The rotary blower in accordance with claim 1, wherein the intermediate hub includes a cylindrical portion extending from an end of the intermediate hub that is opposite the circumferentially extending flange of the intermediate hub, the cylindrical portion having a smaller outer diameter than the remainder of the intermediate hub.

* * * * *